United States Patent
Saitou et al.

(10) Patent No.: US 9,108,392 B2
(45) Date of Patent: *Aug. 18, 2015

(54) DECORATIVE SHEET, AND DECORATIVE RESIN-MOLDED ARTICLE EMPLOYING SAME

(75) Inventors: Nobuo Saitou, Saitama (JP); Emi Harigae, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 13/979,967

(22) PCT Filed: Jan. 28, 2011

(86) PCT No.: PCT/JP2011/051796
§ 371 (c)(1),
(2), (4) Date: Aug. 7, 2013

(87) PCT Pub. No.: WO2012/101820
PCT Pub. Date: Aug. 2, 2012

(65) Prior Publication Data
US 2013/0309460 A1 Nov. 21, 2013

(51) Int. Cl.
*B05D 3/06* (2006.01)
*B32B 27/30* (2006.01)
(Continued)

(52) U.S. Cl.
CPC ............ *B32B 27/365* (2013.01); *B05D 7/04* (2013.01); *B05D 7/24* (2013.01); *B29C 45/14* (2013.01);
(Continued)

(58) Field of Classification Search
CPC .......... B05D 3/06; B05D 3/068; B32B 27/30; B32B 27/308; B32B 27/36; B32B 27/365
USPC ....................................... 428/195.1, 412, 446
See application file for complete search history.

(56) References Cited

U.S. PATENT DOCUMENTS

| 6,350,523 B1 | 2/2002 | Schwalm |
| 2005/0084643 A1 | 4/2005 | Steinberger et al. |
| 2007/0166548 A1 | 7/2007 | Gruber et al. |

FOREIGN PATENT DOCUMENTS

| EP | 2 692 527 | 2/2014 |
| JP | 50-19132 | 2/1975 |

(Continued)

OTHER PUBLICATIONS

Chinese Official Action dated Oct. 10, 2014, for CN Application No. 201180065846.8.
Extended European Search Report dated Aug. 20, 2014, including Supplementary European Search Report and European Search Opinion, for EP Application No. 11857359.1-1303/2669085 (PCT/JP2011/051796).

*Primary Examiner* — Bruce H Hess
(74) *Attorney, Agent, or Firm* — Fitch Even Tabin & Flannery

(57) ABSTRACT

The invention provides a decorative sheet including at least a surface protective layer on a substrate, in which the surface protective layer includes a cured material of an ionizing radiation curable resin composition at least containing a polycarbonate(meth)acrylate (A) and a multi-functional (meth)acrylate (B) in a mass ratio (A)/(B) of (98/2)-(70/30). The invention also provides a decorative sheet including at least a surface protective layer on a substrate, in which the surface protective layer includes a cured material of an ionizing radiation curable resin composition at least containing an acrylic silicone (meth)acrylate (C) and a multi-functional (meth) acrylate (B) in a mass ratio (C)/(B) of (50/50)-(95/5). The present invention provides a decorative sheet with a surface protective layer having scratch resistance as well as three-dimensional formability.

9 Claims, 1 Drawing Sheet

(51) Int. Cl.
  *B32B 27/36* (2006.01)
  *B05D 7/24* (2006.01)
  *B05D 7/04* (2006.01)
  *C08J 7/18* (2006.01)
  *C09D 143/04* (2006.01)
  *C09D 169/00* (2006.01)
  *B29C 45/14* (2006.01)
  *B29L 31/30* (2006.01)
  *B05D 5/06* (2006.01)
  *B05D 7/00* (2006.01)
  *C08G 64/00* (2006.01)

(52) U.S. Cl.
  CPC .......... *B32B 27/30* (2013.01); *B32B 27/36* (2013.01); *C08J 7/18* (2013.01); *C09D 143/04* (2013.01); *C09D 169/00* (2013.01); *B05D 3/068* (2013.01); *B05D 5/06* (2013.01); *B05D 7/52* (2013.01); *B29C 45/14811* (2013.01); *B29C 2045/14729* (2013.01); *B29L 2031/3005* (2013.01); *C08G 64/00* (2013.01); *Y10T 428/24802* (2015.01)

(56) References Cited

FOREIGN PATENT DOCUMENTS

| | | |
|---|---|---|
| JP | 61-17255 | 1/1986 |
| JP | 64-24809 | 1/1989 |
| JP | 3-181517 | 8/1991 |
| JP | 6-57199 | 3/1994 |
| JP | 6-100799 | 4/1994 |
| JP | 6-134859 | 5/1994 |
| JP | 6-287470 | 10/1994 |
| JP | 7-44913 | 2/1995 |
| JP | 2000-53887 | 2/2000 |
| JP | 2000-198840 | 7/2000 |
| JP | 2000-351843 | 12/2000 |
| JP | 2002-46393 | 2/2002 |
| JP | 2002-160320 | 6/2002 |
| JP | 2003-145573 | 5/2003 |
| JP | 2003-181869 | 7/2003 |
| JP | 2004-217809 | 8/2004 |
| JP | 2004-322501 | 11/2004 |
| JP | 2007-70544 | 3/2007 |
| JP | 2009-83301 | 4/2009 |
| JP | 2009-241368 | 10/2009 |
| JP | 2010-222568 | 10/2010 |

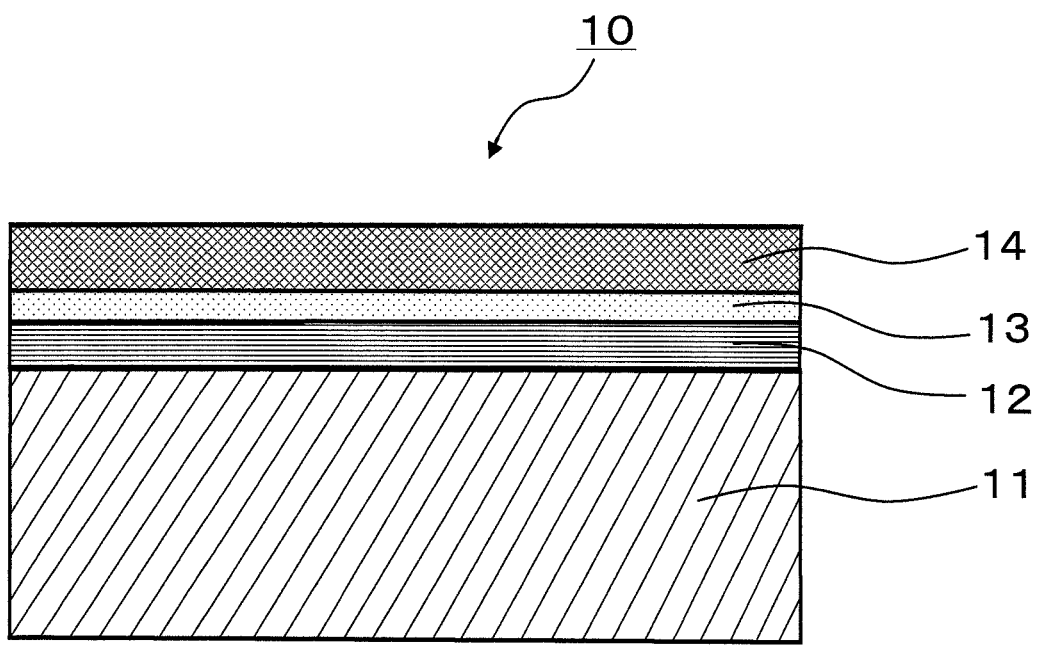

DECORATIVE SHEET, AND DECORATIVE RESIN-MOLDED ARTICLE EMPLOYING SAME

TECHNICAL FIELD

The present invention relates to a decorative sheet with a surface protective layer consisting of a cured material of a specific ionizing radiation curable resin composition.

BACKGROUND ART

A decorative resin-molded article decorated by laminating a decorative sheet on the surface of a molded article is used in various applications such as automotive interior parts. The method of forming such a decorative resin-molded article includes insert molding in which a decorative sheet is first three-dimensionally formed with a vacuum forming mold, the molded sheet is inserted in an injection mold, and then a fluid state of resin is injected in the injection mold to integrate the resin with the molded sheet (for example, see Patent document 1); and simultaneous injection-molding and decoration in which a decorative sheet inserted in a mold is integrated with a melted resin injected in a cavity during injection molding to decorate the surface of the resin compact (for example, Patent documents 2 and 3).

The above-mentioned decorative resin-molded article is provided with a surface protective layer in order to improve the scratch resistance on the surface. However, the above-mentioned method of forming such a decorative resin-molded article has a problem in the process of three-dimensionally forming a decorative sheet with a vacuum forming mold in insert molding and in the process of drawing and firmly attaching a decorative sheet along the inner periphery of a cavity during preforming or during injecting a melted resin in simultaneous injection-molding and decoration. This problem causes the decorative sheet to be drawn more than minimum requirement to fit the shape of the mold due to the effect of vacuum or compressed air or due to the tension generated by the pressure and the shear stress of the melted resin, resulting in a crack generated on the surface protective layer of the curved surface of a molded article.

To approach the above-mentioned problem, an ionizing radiation curable resin such as an ultraviolet curable resin has been used as the surface protective layer for improving the crosslink density of the resin forming the surface protective layer of a decorative sheet so as to attempt to improve the abrasion resistance and the scratch resistance of the surface of a decorative resin-molded article. However, the problem of a crack generated on the curved surface of a molded article during forming still exists.

Alternatively, an ionizing radiation curable resin such as an ultraviolet curable resin used as the surface protective layer has been attempted to be half-cured at the stage of a decorative sheet and then fully cured after decorative molding (see Patent document 4). However, problems are created, in which the surface protective layer containing an uncured resin component is easily scratched and hardly handled and in which the mold is contaminated due to the uncured resin component adhering to the mold. To solve these problems, a protection film may be provided on a half-cured surface protective layer, but this method complicates the manufacturing process and causes cost increases.

Therefore, the surface protective layer with scratch resistance as well as three-dimensional formability is desired.

A resin composition containing a polycarbonate (meth) acrylate is known (for example, Patent documents 5-10), and a resin composition containing a small amount of yellowing polycarbonate urethane acrylate oligomer is used for the inner colored sheet on the back side of the surface transparent sheet of a decorative sheet for insert molding (Patent document 11). However, no polycarbonate(meth)acrylates are used for the surface protective layer of a decorative sheet.

An acrylic silicon resin has the structure in which the acrylic polymer chain is strongly cross-linked by a siloxane bond, providing excellent weatherability, heat resistance, chemical resistance, and water resistance so as to be widely used in exterior paint. However, if an acrylic silicon resin is used as the surface protective layer in order to improve the scratch resistance on the surface of a resin-molded article, the formed film becomes hard and fragile, possibly causing a crack. To prevent a crack from being generated, a curing process such as ultraviolet curing is applied to a sheet for insert molding after vacuum forming or to a resin molded article after injection molding when an acrylic silicon resin is used as the surface protective layer (for example, see Patent documents 12-14).

However, the curing process applied to a three-dimensionally molded article is complicated with poor economical efficiency, hardly providing uniform curing.

Therefore, the surface protective layer, which has three-dimensional formability as well as scratch resistance while maintaining the excellent chemical resistance of the acrylic silicon resin, is desired

CITATION LIST

Patent document 1: JP 2004-322501 A
Patent document 2: JP S50-19132 A
Patent document 3: JP S61-17255 A
Patent document 4: JP H6-134859 A
Patent document 5: JP S64-24809 A
Patent document 6: JP H3-181517 A
Patent document 7: JP H7-44913 A
Patent document 8: JP 2000-53887 A
Patent document 9: JP 2000-198840 A
Patent document 10: JP 2000-351843 A
Patent document 11: JP 2003-145573 A
Patent document 12: JP H6-57199 A
Patent document 13: JP H6-100799 A
Patent document 14: JP H6-287470 A

DISCLOSURE OF THE INVENTION

An objective of the present invention is to provide a decorative sheet with a surface protective layer having scratch resistance as well as three-dimensional formability under such a situation.

As a result from the extensive studies to achieve a solution to the above-mentioned problem, the inventors have found that the surface protective layer of a decorative sheet consists of a cured material of a specific ionizing radiation curable resin composition can solve this problem. The present invention is achieved based on this finding.

The present invention provides:

(1) a decorative sheet comprising at least a surface protective layer on a substrate, in which the surface protective layer includes a cured material of an ionizing radiation curable resin composition at least containing a polycarbonate (meth)acrylate (A) and a multi-functional (meth)acrylate (B) in a mass ratio (A)/(B) of (98/2)-(70/30);

(2) a decorative sheet comprising at least a surface protective layer on a substrate, in which the surface protective layer includes a cured material of an ionizing radiation curable resin composition at least containing an acrylic silicone (meth)acrylate (C) and a multi-functional (meth)acrylate (B) in a mass ratio (C)/(B) of (50/50)-(95/5); and (3) a decorative resin-molded article formed by using the decorative sheet according to the above-mentioned (1) or (2).

The decorative sheet of the present invention can provide a decorative resin-molded article with excellent scratch resistance and easy three-dimensional formability with no cracks being generated on the surface protective layer in insert molding and in simultaneous injection-molding and decoration because the surface protective layer has excellent scratch resistance as well as excellent three-dimensional formability and also has excellent chemical resistance.

BRIEF DESCRIPTION OF THE DRAWINGS

FIG. 1 shows a pattern diagram illustrating the cross section of an aspect of the decorative sheet of the present invention.

PREFERRED MODE FOR CARRYING OUT THE INVENTION

The decorative sheet of the first embodiment of the present invention includes at least a surface protective layer on a substrate, in which the surface protective layer includes a cured material of an ionizing radiation curable resin composition at least containing a polycarbonate(meth)acrylate (A) and a multi-functional (meth)acrylate (B) in a mass ratio (A)/(B) of (98/2)-(70/30).

The ionizing radiation curable resin composition is referred herein to as a composition containing an ionizing radiation curable resin. The ionizing radiation curable resin has an energy quantum capable of cross-linking and polymerizing molecules in electromagnetic radiation or charged particle radiation. Specifically, the ionizing radiation curable resin composition is cross-linked and cured by being irradiated with ultraviolet rays or electron beams. Additionally, electromagnetic radiation including X rays and y rays and charged particle radiation including a rays and ion lines can be used as ionizing radiation.

In the first embodiment of the invention, a polycarbonate (meth)acrylate (A) and a multi-functional (meth)acrylate (B) are at least used as the ionizing radiation curable resin. If the mass ratio (A)/(B) of the polycarbonate(meth)acrylate (A) to the multi-functional (meth)acrylate (B) is more than 98/2 (specifically if the amount of the polycarbonate(meth)acrylate (A) is more than 98 mass %), the scratch resistance decreases. On the other hand, if the mass ratio (A)/(B) of the polycarbonate(meth)acrylate (A) to the multi-functional (meth)acrylate (B) is less than 70/30 (specifically if the amount of the polycarbonate(meth)acrylate (A) is less than 70 mass %), the three-dimensional formability decreases. Preferably, the mass ratio (A)/(B) of the polycarbonate(meth) acrylate (A) to the multi-functional (meth)acrylate (B) is (95/5)-(80/20).

In the present invention, "(meth)acrylate" means "acrylate or methacrylate." Other similar terms are also regarded as synonymous in this way.

The polycarbonate(meth)acrylate (A) used in the present invention is limited in particular as long as having a carbonate bond in the polymer main chain and further having a (meth) acrylate at the end or the side chain. This polycarbonate (meth)acrylate has preferably more than two functional groups from the viewpoint of cross-linking and curing.

The above-mentioned polycarbonate(meth)acrylate (A) is obtained, for example, by converting a part or all of the hydroxyl groups of a polycarbonate polyol to a (meth)acrylate (acrylic ester or methacrylic ester). This esterification can be conducted by a typically used esterification. For example, this esterification is conducted by 1) condensing a polycarbonate polyol together with an acrylic acid halide or a methacrylic acid halide in the presence of a base; 2) condensing a polycarbonate polyol together with an acrylic acid anhydride or a methacrylic acid anhydride in the presence of a catalyst; or 3) condensing a polycarbonate polyol together with acrylic acid or methacrylic acid in the presence of an acid catalyst.

The above-mentioned polycarbonate polyol has a carbonate bond in the polymer main chain and further has 2 or more, preferably 2-50, more preferably 3-50 hydroxyl groups at the end or the side chain. A typical method of generating this polycarbonate polyol is the polycondensation reaction of a diol compound (d), a trivalent or higher polyvalent alcohol (e), and a compound (f) to be the carbonyl component.

The diol compound (d) used as the raw material is represented by the general formula HO—$R^1$—OH. $R^1$ is a divalent hydrocarbon group with 2-20 atoms and may include an ether bond. For example, $R^1$ is a normal or branched alkylene group, a cyclohexylene group, and a phenylene group.

The specific example of the diol compound includes ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5 pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol, and 1,4-cyclohexanedimethanol. These diols may be used alone or in combination with two or more kinds.

The example of the polyvalent alcohol (e) includes trimethylolpropane, trimethylolethane, pentaerythritol, ditrimethylolpropane, dipentaerythritol, glycerin, and sorbitol. The trivalent or higher polyvalent alcohol (e) may have a hydroxyl group in which ethylene oxide, propylene oxide, or other alkylene oxides are added in an equivalent of 1-5 based on the hydroxyl groups of each of these polyvalent alcohols. These polyvalent alcohols may be used alone or in combination with two or more kinds.

The compound (f) to be the carbonyl component is any one selected from diester carbonate, phosgene, and these equivalents of thereof. Specifically, the compound (f) includes diester carbonates such as dimethyl carbonate, diethyl carbonate, diisopropyl carbonate, diphenyl carbonate, ethylene carbonate, and propylene carbonate; phosgene; or halogenated formates such as methyl chloroformate, ethyl chloroformate, and phenyl chloroformate. These may be used alone or in combination with two or more kinds.

The polycarbonate polyol is synthesized by the polycondensation reaction of the above-mentioned diol compound (d), trivalent or higher polyvalent alcohol (e), and compound (f) to be the carbonyl component under a general condition. For example, the molar ratio (d)/(e) of the diol compound (d) to the polyvalent alcohol (e) as raw materials preferably falls within the range of (50/50)-(99/1). The molar ratio of the compound (f) to be the carbonyl component to the diol compound (d) and the polyvalent alcohol (e) is preferably 0.2-2 equivalents based on the hydroxyl groups of the diol compound and the polyvalent alcohol.

The equivalent number (eq./mol) of the hydroxyl groups existing in the polycarbonate polyol after the condensation polymerization conducted at the above-mentioned molar ratio is 3 or more, preferably 3-50, more preferably 3-20 on average in one molecule. This range generates the required number of the (meth)acrylate groups by the below-mentioned esterification and provides moderate flexibility to a polycarbonate(meth)acrylate resin. The terminal functional groups of this polycarbonatepolyol are usually OH groups, but some of which may be carbonate groups.

The method of generating the polycarbonate polyol is described in, for example, JP S64-1726 A. This polycarbonate polyol can also be produced by the transesterification of a polycarbonate diol and a trivalent or higher polyvalent alcohol as described in JP H3-181517 A.

The molecular weight of the polycarbonate(meth)acrylate (A) used in the present invention is measured by GPC analysis. The standard polystyrene equivalent weight-average molecular weight is preferably 500 or more, more preferably 1,000 or more, further more preferably more than 2,000. The upper limit of the weight-average molecular weight of the polycarbonate(meth)acrylate (A) is not limited in particular, but preferably 100,000 or less, more preferably 50,000 or less from the viewpoint of controlling the viscosity not to be increased too much. From the viewpoint of maintaining the scratch resistance as well as the three-dimensional formability, the upper limit of the weight-average molecular weight of the polycarbonate(meth)acrylate (A) is further more preferably more than 2,000 and 50,000 or less, particularly preferably 5,000-20,000.

The multi-functional (meth)acrylate (B) used in the present invention is not limited in particular as long as being a (meth) acrylate with two or more functional groups. However, a (meth)acrylate with three or more functional groups is preferable from the viewpoint of the curability. The n functional groups means herein that the number of ethylene unsaturated bonds {(meth)acryloyl groups} in a molecule is n.

The multi-functional (meth)acrylate (B) may be an oligomer or a monomer. However, the multi-functional (meth) acrylate (B) is preferably a multi-functional (meth)acrylate oligomer from the viewpoint of improving the three-dimensional formability.

The above-mentioned multi-functional (meth)acrylate oligomer includes, for example, a urethane (meth)acrylate oligomer, an epoxy (meth)acrylate oligomer, a polyester (meth) acrylate oligomer, and a polyether (meth)acrylate oligomer. The urethane (meth)acrylate oligomer can be obtained, for example, by esterifying a (meth)acrylic acid with a polyurethane oligomer obtained by reacting a polyetherpolyol or a polyester polyol with a polyisocyanate. The epoxy (meth) acrylate oligomer can be obtained, for example, by esterifying a (meth)acrylic acid with the oxirane ring of a bisphenol epoxy resin or a novolac epoxy resin with a relatively low molecular weight. A carboxyl modified-epoxy (meth)acrylate oligomer obtained by partially modifying this epoxy (meth)acrylate oligomer with a dibasic carboxylic acid anhydride can be used. The polyester (meth)acrylate oligomer can be obtained, for example, by esterifying a (meth)acrylic acid with the hydroxyl groups of a polyester oligomer having hydroxyl groups at the both ends that has being obtained by condensing a polyvalent carboxylic acid with a polyvalent alcohol or by esterifying a (meth)acrylic acid with the hydroxyl group at an end of an oligomer obtained by adding an alkylene oxide to a polyvalent carboxylic acid. The polyether (meth)acrylate oligomer can be obtained by esterifying a (meth)acrylic acid with the hydroxyl groups of a polyetherpolyol.

Other multi-functional (meth)acrylate oligomers include a high hydrophobic polybutadiene (meth)acrylate oligomer with a (meth)acrylate group in the side chain of the polybutadiene oligomer; a silicone (meth)acrylate oligomer with a polysiloxane bond in the main chain; and an aminoplast resin (meth)acrylate oligomer in which an aminoplast resin with a large number of reactive groups in the small molecular is modified.

The above-mentioned multi-functional (meth)acrylate monomer includes, specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxy pivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa (meth)acrylate, ethylene oxide-modified dipentaerythritol hexa(meth)acrylate, and caprolactone-modified dipentaerythritol hexa(meth)acrylate.

The above-mentioned multi-functional (meth)acrylate oligomers and monomers may be used alone or in combination of two or more kinds.

The second embodiment of the invention is a decorative sheet including at least a surface protective layer on a substrate, in which the surface protective layer includes a cured material of an ionizing radiation curable resin composition at least containing an acrylic silicone (meth)acrylate (C) and a multi-functional (meth)acrylate (B) in amass ratio (C)/(B) of (50/50)-(95/5). The ionizing radiation curable resin composition, the ionizing radiation curable resin, and the ionizing radiation are as described above.

In the second embodiment of the invention, an acrylic silicone (meth)acrylate (C) and a multi-functional (meth) acrylate (B) are at least used as the ionizing radiation curable resin. If the mass ratio (C)/(B) is less than (50/50) (specifically if the amount of (C) is less than 50 mass % based on the total amount of (B) and (C)), the chemical resistance and the scratch resistance decrease. On the other hand, if the mass ratio (C)/(B) is more than (95/5) (specifically if the amount of (C) is more than 95 mass % based on the total amount of (B) and (C)), the scratch resistance and the three-dimensional formability decrease.

The acrylic silicone (meth)acrylate (C) used in the present invention is not limited in particular as long as a part of the structure of the acrylic resin is substituted with a siloxane bond (Si—O) in one molecule and as long as the side chain and/or the main chain end of the acrylic resin has two or more (meth)acryloyloxy (acryloyloxy or methacryloyloxy) groups as functional groups in one molecule.

The example of this acrylic silicone (meth)acrylate (C) preferably includes the structure of an acrylic resin with a siloxane bond at the side chain as disclosed in JP 2007-070544 A.

The acrylic silicone (meth)acrylate (C) used in the present invention can be synthesized, for example, by the radical copolymerization of a silicone macromonomer with a (meth) acrylate monomer in the existence of a radical polymerization initiator.

The (meth)acrylate monomer includes methyl(meth)acrylate, ethyl(meth)acrylate, propyl(meth)acrylate, butyl(meth)

acrylate, 2-ethylhexyl(meth)acrylate, and glycidyl(meth) acrylate. These (meth)acrylate monomers are used alone or in combination with two kinds.

The silicone macromonomer is synthesized, for example, by the anionic living polymerization of a hexa-alkyl cyclotrisiloxane in the existence of n-butyl lithium or lithium silanolate as the polymerization initiator and then by capping reaction with a silane containing a radically polymerizable unsaturated group. As the silicone macromonomer, the compound represented by the following formula (1) is suitably used.

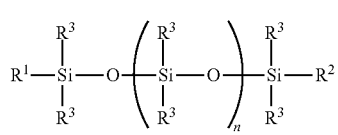

(1)

In the formula (1), $R^1$ represents an alkyl group with 1-4 carbon atoms, preferably a methyl group or an n-butyl group. $R^2$ represents a monovalent organic group, preferably —CH=CH$_2$, —C$_6$H$_4$—CH=CH$_2$, —(CH$_2$)$_3$O(CO)CH=CH$_2$, or —(CH$_2$)$_3$O(CO)C(CH$_3$)=CH$_2$. $R^3$'s may be the same as or different from each other, each of which represents a hydrocarbon group with 1-6 carbon atoms, preferably an alkyl group or a phenyl group with 1-4 carbon atoms, more preferably a methyl group. The value n is not limited in particular, but the number-average molecular weight of the silicone macromonomer is preferably 1000-30000, more preferably 1,000-20,000.

For example, the acrylic silicone (meth)acrylate (C) obtained by using the above-mentioned raw materials has the following structural units represented by the formulas (2), (3), and (4).

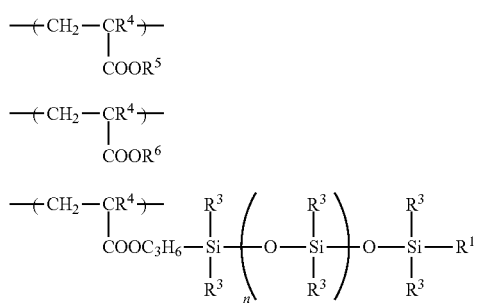

In the formulas (2), (3), and (4), $R^1$ and $R^3$ represent the same as defined in the formula (1). $R^4$ represents a hydrogen atom or a methyl group. $R^5$ represents an alkyl group or a glycidyl group in the above-mentioned (meth)acrylate monomer or represents an alkyl group that may have a functional group such as an alkyl group or a glycidyl group in the above-mentioned (meth)acrylate monomer. $R^6$ represents an organic group with a (meth)acryloyloxy group.

The above-mentioned acrylic silicone (meth)acrylates (C) are used alone or in combination with two kinds.

The molecular weight of the above-mentioned acrylic silicone (meth)acrylate (C) is measured by GPC analysis. The standard polystyrene equivalent weight-average molecular weight is preferably 1,000 or more, more preferably 2,000 or more. The upper limit of the weight-average molecular weight of the acrylic silicone (meth)acrylate (C) is not limited in particular, but preferably 150,000 or less, more preferably 100,000 or less from the viewpoint of controlling the viscosity not to be increased too much. From the viewpoint of maintaining the three-dimensional formability, the chemical resistance, and the scratch resistance, the upper limit of the weight-average molecular weight is further more preferably 2,000-100,000.

The mean molecular weight between the cross-linking points of the acrylic silicone (meth)acrylate (C) is preferably 100-2,500. The mean molecular weight between the cross-linking points is preferably 100 or more from the viewpoint of the three-dimensional formability and also preferably 2,500 or less from the viewpoint of the chemical resistance and the scratch resistance.

The multi-functional (meth)acrylate (B) used in the second embodiment of the invention is the same as that used in the first embodiment. In particular, in the second embodiment of the present invention, the Young's modulus determined in the below-mentioned test preferably 60-2,000 MPa, more preferably 100-1,500 MPa from the viewpoint of maintaining the three-dimensional formability and the scratch resistance.

In the present invention, a monofunctional (meth)acrylate can be optionally used together with the above-mentioned polyfunctional (meth)acrylate (B) for the purpose of decreasing the viscosity without departing from the scope of the present invention. The monofunctional (meth)acrylate includes, for example, methyl(meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, lauryl(meth)acrylate, stearyl(meth)acrylate, and isobornyl(meth)acrylate. These monofunctional (meth)acrylates may be used alone or in combination of two or more kinds.

When an ultraviolet curable resin composition is used as the ionizing radiation curable resin composition, a photopolymerization initiator is preferably added in a content of about 0.1-5 parts by mass based on 100 parts by mass of the ultraviolet curable resin. The photopolymerization initiator can be optionally selected from conventionally used ones without particular limitation, including, for example, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propan-1-one, 4-(2-hydroxyethoxy)phenyl-2 (hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, and acetophenone dimethyl ketal.

For example, a photosensitizer based on a p-dimethylbenzoic acid ester, a tertiary amine, a thiol, or the like can be used.

In the present invention, an electron beam curable resin composition is preferably used as the ionizing radiation curable resin composition. The electron beam curable resin composition is allowed to be solventless and preferred from the viewpoint of environment and health. Furthermore, the electron beam curable resin composition provides stable curing characteristics without a photopolymerization initiator.

In the ionizing radiation curable resin composition forming the surface protective layer in the present invention, various additives can be mixed according to the desired physical properties of a curable resin layer to be obtained. These additives include, for example, a weather resistance improver, an abrasion resistance enhancer, a polymerization inhibitor, a cross-linking agent, an infrared absorbent, an antistatic agent, an adhesion enhancer, a leveling agent, a thixotropic agent, a coupling agent, a plasticizer, an antifoaming agent, a filler, a solvent, and a colorant.

As the weather resistance improver, an ultraviolet absorber, and a photostabilizer can be used. The ultraviolet absorber may be inorganic or organic. As the inorganic ultraviolet absorber, titanium dioxide, cerium oxide, and zinc oxide, which have a mean particle size of about 5-120 nm, can preferably be used. The organic ultraviolet absorber is based on, for example, a benzotriazole, specifically 2-(2-hydroxy-5-methylphenyl)benzotriazole, 2-(2-hydroxy-3,5-di-tert-amylphenyl)benzotriazole, and 3-[3-(benzotriazole-2-yl)-5-tert-butyl-4-hydroxyphenyl]propionate ester of polyethylene glycol, or the like. The photostabilizer includes, for example, a photostabilizer based on a hindered amine, specifically bis (1,2,2,6,6-pentamethyl-4-piperidyl) 2-(3,5-di-tert-butyl-4-hydroxybenzyl)-2'-n-butylmalonate, bis(1,2,2,6,6-pentamethyl-4-piperidyl)sebacate, tetrakis(2,2,6,6-tetramethyl-4-piperidyl)-1,2,3,4-butane tetracarboxylate, or the like. Furthermore, a reactive ultraviolet absorber and a reactive photostabilizer that have a polymerizable group such as a (meth)acryloyl group in the molecule can be used. The ultraviolet absorber and the photostabilizer that are to be used can be copolymerized without impairing the properties (scratch resistance and three-dimensional formability) as the surface protective layer consisting of the polymer according to the present invention.

The abrasion resistance enhancer includes, for example, spherical particles of inorganic substances such as α-alumina, silica, kaolinite, iron oxide, diamond, and silicon carbide. The shape of particle includes a sphere, an ellipsoid, a polyhedron, a scale, and the like, preferably a sphere but is not limited in particular. The particles of organic substances include beads consisting of a synthetic resin such as a cross-linked acrylic resin and a polycarbonate resin. The particle size is typically about 30-200% of the film thickness. Particularly, spherical α-alumina is preferable in terms of high hardness, large effect on the improvement of the abrasion resistance, and easy obtainability of the spherical particles.

As the polymerization inhibitor, for example, hydroquinone, p-benzoquinone, hydroquinone monomethyl ether, pyrogallol, t-butylcatechol, and the like are used.

As the cross-linking agent, for example, a polyisocyanate compound, an epoxy compound, a metal chelate compound, an aziridine compound, an oxazoline compound, and the like are used.

As the filler, for example, barium sulfate, talc, clay, calcium carbonate, aluminium hydroxide, and the like are used.

As the colorant, for example, well-known color pigments such as quinacridone red, isoindolinone yellow, phthalocyanine blue, phthalocyanine green, titanium oxide, and carbon black, and the like are used.

As the infrared absorbent, for example, a dithiol metal complex, a phthalocyanine compound, a diimmonium compound, and the like are used.

The configuration of the decorative sheet of the present invention will be explained in detail in reference to FIG. 1.

FIG. 1 shows a pattern diagram illustrating the cross section of an aspect of the decorative sheet 10 of the present invention used for insert molding. In the example shown in FIG. 1, a picture layer 12, a primer layer 13, and a surface protective layer 14 are sequentially laminated on a substrate 11. The surface protective layer 14 is formed by cross-linking and curing the above-mentioned ionizing radiation curable resin composition.

The substrate 11 is selected in consideration of the vacuum formability, and a resin sheet consisting of a thermoplastic resin is therefore typically used. As the thermoplastic resin, polyolefin resins such as an acrylonitrile-butadiene-styrene resin (hereinafter referred to as "ABS resin"), an acrylic resin, a polypropylene, and a polyethylene; a polycarbonate resin; a vinyl chloride resin, and the like are generally used. For the substrate 11, a single-layer sheet of these resins or a multilayer sheet of the same or different resins can be used.

The thickness of the substrate is selected based on the application, typically about 0.05-1.0 mm, more typically about 0.1-0.7 mm in consideration of the cost and the like.

These substrates can be subjected to physical or chemical surface treatment by oxidation, unleveling, or the like to improve the adhesion to the layer provided on the sheet, if desired.

The oxidation includes, for example, the corona discharge treatment, chromium oxidation treatment, flame treatment, hot air treatment, and ultraviolet-ozone treatment. The unleveling includes, for example, sandblasting and solvent treatment. These surface treatments are optionally selected depending on the type of substrate. Generally, corona discharge treatment is preferably used from the viewpoint of the effect, the operability, and the like.

On the substrate, a primer layer may be formed, painting may be applied for adjusting the color, or a designed pattern may previously be formed.

The picture layer 12 shown in FIG. 1 provides decoration to a decorative resin-molded article. The picture layer is formed by printing various patterns with ink and a printer. The pattern includes a wood grain pattern, a pebble grain pattern imitating the surface of rock, such as marble (for example, travertine marble), a texture grain pattern imitating texture and cloth, a tiling pattern, and a brickwork pattern, as well as a mosaic and a patchwork patterns made by fitting together these patterns. These patterns are formed by process printing using typical process colors: yellow, red, blue, and black. These patterns are also each formed by process printing characterized by preparing printing plates corresponding to the colors composing these respective patterns.

As the design ink used for the picture layer 12, colorants such as a pigment and a dye, an extender pigment, a solvent, a stabilizer, a plasticizer, a catalyst, and a hardener, which are optionally mixed in a binder, are used. The binder is used without limitation in particular. For example, a polyurethane resin, a vinyl chloride/vinyl acetate copolymer resin, a vinyl chloride/vinyl acetate/acrylic copolymer resin, a chlorinated polypropylene resin, an acrylic resin, a polyester resin, a polyamide resin, a butyral resin, a polystyrene resin, a nitrocellulose resin, a cellulose acetate resin, and the like are optionally used alone or in combination with two or more kinds.

As the colorant, inorganic pigments such as carbon black (Indian ink), iron black, titanium white, antimony white, chrome yellow, titanium yellow, red iron oxide, cadmium red, ultramarine blue, and cobalt blue; organic pigments or dyes such as quinacridone red, isoindolinone yellow, and phthalocyanine blue; a metallic pigment consisting of scale-like foil of aluminum, brass, or the like; a pearlescent (pearl) pigment consisting of scale-like foil of titanium dioxide-coated mica, basic lead carbonate, or the like; and the like are used.

The decorative sheet 10 of the present invention may be provided with a hiding layer (not shown) between the substrate 11 and the picture layer 12, if desired. The hiding layer is provided so as to avoid the color change or variation of the surface of the substrate 11 from affecting the color of the pattern of the decorative sheet 10. The hiding layer is often formed in an opaque color. A so-called solid print layer with a thickness of 1-20 μm is suitably used for the hiding layer.

To hardly cause a minute crack and whitening on the drawn part of the surface protective layer 14, the decorative sheet 10 of the present invention can be provided with the primer layer 13 between the picture layer 12 and the surface protective layer 14, if desired. As the primer composition forming the primer layer 13, binder resins such as a (meth)acrylic resin, a urethane resin, a (meth)acrylic-urethane copolymer resin, a vinyl chloride-vinyl acetate copolymer, a polyester resin, a butyral resin, a chlorinated polypropylene, and a chlorinated polyethylene are preferably used alone or in combination with two or more kinds. Among these, a urethane resin, a (meth)acrylic resin, and a (meth)acrylic/urethane copolymer resin are preferable. From the viewpoint of the chemical resistance and the adhesion to the surface protective layer 14, a cross-linking agent is preferably used for the formation of the primer layer 14.

The (meth)acrylic resin includes a homopolymer of (meth) acrylic acid ester, a copolymer of two or more different kinds of (meth)acrylic acid ester monomers, and a copolymer of a (meth)acrylic acid ester monomer and other monomers. Specifically, a (meth)acrylic resin consisting of a homopolymer or a copolymer containing a (meth)acrylic acid ester, such as poly[methyl(meth)acrylate], poly[ethyl(meth)acrylate], poly[propyl(meth)acrylate], poly[butyl (meth)acrylate], methyl (meth)acrylate-butyl (meth)acrylate copolymer, ethyl (meth) acrylate-butyl (meth)acrylate copolymer, ethylene-methyl (meth)acrylate copolymer, or styrene-methyl (meth)acrylate copolymer, is suitably used. The (meth)acryl means acryl or methacryl herein.

As the urethane resin, a polyurethane consisting of polyol (polyvalent alcohol) as the base compound and isocyanate as the cross-linking agent (curing agent) can be used. The polyol has two or more hydroxyl groups in the molecule. For example, a polyester polyol, a polyethylene glycol, a polypropylene glycol, an acrylic polyol, a polyether polyol, and the like are used. As the above-mentioned isocyanate, a polyvalent isocyanate with two or more isocyanate groups in the molecule; an aromatic isocyanate such as 4,4-diphenylmethane diisocyanate; and aliphatic (or alicyclic) isocyanates such as hexamethylene diisocyanate, isophorone diisocyanate, hydrogenated tolylene diisocyanate, and hydrogenated diphenylmethane diisocyanate are used. The urethane resin can be combined with a butyral resin.

From the viewpoint of the adhesion to the surface protective layer 14, the physical properties, and the formability after cross-linking, an acrylic polyol or a polyester polyol as the polyol is preferably combined with hexamethylene diisocyanate or 4,4-diphenylmethane diisocyanate as the cross-linking agent. Particularly, an acrylic polyol is preferably combined with hexamethylene diisocyanate.

The (meth)acrylic-urethane copolymer resin is preferably, for example, an acrylic/urethane (polyester urethane) block copolymer resin. As the curing agent, the above-mentioned various isocyanates are used. In the acrylic/urethane (polyester urethane) block copolymer resin, the ratio (mass ratio) of acryl/urethane is preferably adjusted to (9/1)-(1/9), more preferably (8/2)-(2/8), if desired. Since it can be used for various decorative sheets, this acrylic/urethane (polyester urethane) block copolymer resin is particularly preferable as the resin used for the primer composition.

To improve the adhesion to the injection resin, the decorative sheet 10 of the present invention can be provided with aback surface (opposite to the surface protective layer 14) adhesive layer (not shown) of the decorative sheet 10, if desired. For the adhesive layer, a thermoplastic resin or a curable resin is used according to the injection resin. The thermoplastic resin includes an acrylic resin, an acrylic modified polyolefin resin, a chlorinated polyolefin resin, a vinyl chloride-vinyl acetate copolymer, a thermoplastic urethane resin, a thermoplastic polyester resin, a polyamide resin, and a rubber-based resin. These can be used alone or in combination with two or more kinds. The thermosetting resin includes a urethane resin and an epoxy resin.

The surface protective layer 14 is formed by preparing, applying, cross-linking, and curing a coating liquid containing the above-mentioned ionizing radiation curable resin composition. The viscosity of the coating liquid is not limited in particular as long as being capable of forming an uncured resin layer on the surface of the substrate by the below-mentioned coating method.

In the present invention, a prepared coating liquid is coated on the surface of the picture layer 12 or the primer layer 13 by well-known methods such as gravure coating, bar coating, roll coating, reverse roll coating, and comma coating, preferably gravure coating to form the uncured resin layer so that the surface protective layer 14 a thickness of 1-1000 μm after curing.

In the present invention, the uncured resin layer formed in this way is cured by being irradiated with ionizing radiation such as electron beams or ultraviolet rays. When electron beams are used as the ionizing radiation, the accelerating voltage can appropriately be selected based on the resin to be used and the thickness of the layer. However, the uncured resin layer is typically preferably cured at an accelerating voltage of about 70-300 kV.

In the irradiation with electron beams, the higher accelerating voltage increases the penetrating power more. When a substrate deteriorated by electron beams is used as the substrate 11, the accelerating voltage is selected so that the penetration depth of electron beams is substantially equal to the thickness of the resin layer. Therefore, the substrate 11 can be prevented from being excessively irradiated with electron beams to minimize the deterioration of the substrate being caused by excess electron beams.

The irradiation dose when the crosslink density of the resin composition layer is saturated is preferable, which is selected from the range of typically 5-300 kGy (0.5-30 Mrad), preferably 10-50 kGy (1-5 Mrad).

The electron beam source is not limited in particular. For example, various electron beam accelerators such as a Cockcroft-Walton accelerator, a van de Graaff accelerator, a resonance transformer accelerator, an insulated core transformer accelerator, a linear accelerator, a dynamitron accelerator, and a high frequency accelerator can be used.

When used as ionizing radiation, the ultraviolet rays are emitted at a wavelength of 190-380 nm. The ultraviolet ray source is not limited in particular. For example, a high-pressure mercury lamp, a low-pressure mercury lamp, a metal halide lamp, and a carbon-arc lamp are used.

To the cured resin layer formed in this way, various additives are added to provide various functions, for example, with high hardness and scratch resistance, such as hard coating function, antifog coating function, antifouling coating function, anti-glare coating function, antireflection coating function, ultraviolet screen coating function, and infrared screen coating function.

In the present invention, the surface protective layer 14 preferably has a thickness of 1-1000 μm. The surface protective layer 14 with a thickness of 1 μm or more after curing obtains sufficient physical properties such as the scratch resistance and the weatherability as a protection layer. On the other hand, the surface protective layer 14 with a thickness of 1000 μm or less after curing has an economical advantage because it is uniformly cured by easily uniformly being irradiated with ionizing radiation.

The surface protective layer 14 with a thickness of preferably 1-50 μm, more preferably 1-30 μm can improve the three-dimensional formability to obtain high shape following capability to a complex three dimensional shape for use in an automotive interior and the like. Therefore, the decorative sheet of the present invention can exhibit excellent three-dimensional formability even if a hard ionizing radiation curable resin is combined. Furthermore, the decorative sheet can harden the coating film without impairing the three-dimensional formability. As the result, the decorative sheet can have a preferably excellent scratch resistance in the processing and the practical use.

Even if the surface protective layer 14 is thicker than the conventional ones, the decorative sheet of the present invention obtains sufficiently high three-dimensional formability. Therefore, the decorative sheet is useful for a member required to have a high film thickness on the surface protective layer, particularly for an automotive exterior.

The picture layer 12 is formed by a typical printing method such as gravure printing. The hiding layer is formed by a typical printing method such as gravure printing; and typical coating methods such as gravure coating, gravure reverse coating, gravure offset coating, spinner coating, roll coating, and reverse roll coating.

The primer layer 13 and the adhesive layer are formed by typical coating methods and transcription coating methods such as gravure coating, gravure reverse coating, gravure offset coating, spinner coating, roll coating, reverse roll coating, kiss coating, wheeler coating, dip coating, solid coating by silk screen, wire bar coating, flow coating, comma coating, continuous flow coating, brush coating, and spray coating. In the transfer coating, the coating film of the primer layer 13 or the adhesive layer is formed on a thin sheet (film substrate) and then coated on the surface of a target layer of the decorative sheet 10.

The thickness of the picture layer 12 is appropriately selected by the design. The thickness of the hiding layer is about 1-20 μm.

The thickness of the primer layer 13 is preferably about 0.1-10 μm. The primer layer with a thickness of 0.1 μm or more can substantially produces an effect to preventing a crack, breaking, whitening, and the like from being generated on the surface protective layer. On the other hand, the primer layer with a thickness of 10 μm or less does preferably not fluctuate the three-dimensional formability because the coated film is stably dried and cured when the primer layer is coated. Therefore, the thickness of the primer layer is more preferably about 1-10 μm. For the same reason as the primer layer, the thickness of the adhesive layer is preferably about 0.1-10 μm.

The decorative sheet of the present invention can be used for various injection molding processes such as insert molding, simultaneous injection-molding and decoration, blow molding, and gas injection molding. The decorative sheet is suitably used for insert molding and simultaneous injection-molding and decoration.

In the insert molding, the decorative sheet of the present invention is subjected to previously vacuum forming (off-line preforming) to form the surface shape of a molded article with a vacuum forming mold. Then, the decorative sheet with the surface shape is trimmed to obtain a molded sheet. This molded sheet is inserted in an injection mold, and the injection mold is clamped. Then, a fluid state of resin is injected and solidified in the mold. The decorative sheet is integrated with the outer surface of the formed resin composite at the same time of injection molding to produce a decorative resin-molded article.

The injection resin, typically polyolefin resins such as polyethylene and polypropylene; and thermoplastic resins such as an ABS resin, a styrene resin, a polycarbonate resin, an acrylic resin, and a vinyl chloride resin are used based on the application. Thermosetting resins such as a urethane resin and an epoxy resin can be used based on the application.

In the simultaneous injection-molding and decoration, the decorative sheet of the present invention is disposed on a female mold convertible to a vacuum forming mold in which a vacuum hole for injection molding is provided. This female mold is used for preforming (in-line preforming), and then the injection mold is clamped. Then, a fluid state of resin is injected, filled, and solidified in the mold. The decorative sheet is integrated with the outer surface of the formed resin composite at the same time of injection molding to produce a decorative resin-molded article.

In the simultaneous injection-molding and decoration, the decorative sheet may receive a thermal pressure from the injected resin. When the decorative sheet, the drawing of which is small, is near the flat plate, the decorative sheet may not be preheated. In the simultaneous injection-molding and decoration, the injection resin as explained in the description on the insert molding can be used.

With no cracks being generated on the surface protective layer during the molding process, the decorating resin compact produced as described above has excellent three-dimensional formability, and the surface has high scratch resistance. The decorating resin compact also has high solvent resistance and chemical resistance. In the manufacturing method of the present invention, the surface protective layer is completely cured at the stage of producing the decorative sheet. Therefore, the step of cross-linking and curing the surface protective layer is unnecessary after the decorating resin compact is produced.

EXAMPLES

The present invention will be explained in more detail with reference to Examples below but is not limited thereto.
Evaluation Method
(1) Three-Dimensional Formability (Vacuum Forming)

The decorative sheet obtained in each of the examples and the comparative examples is subjected to vacuum forming in the below-mentioned methods, and then the appearance was evaluated. The criterion is as follows.

AAA: No coating cracks nor whitening was observed on the surface protective layer, and good shape following to the mold was accomplished.

AA: A minute coating crack or whitening was observed on a part of the three-dimensional part or the fully drawn part, but no practical problems were identified.

A: A minor coating crack or whitening was observed on a part of the three-dimensional part or the fully drawn part.

F: No shape following to the mold was able to be accomplished, and a coating crack and whitening were observed on the surface protective layer.
Vacuum Forming The decorative sheet is heated and softened at 160° C. with an infrared heater. The decorative sheet is subjected to vacuum forming at a maximum draw ratio of 150% by using a vacuum forming mold and formed in the inner shape of the mold. The decorative sheet is cooled and then demolded.

(2) Scratch Resistance (Method A)

The appearance of the test specimen was evaluated after scratched 5 times at a load of 1.5 kgf with #0000 steel wool. The criterion is as follows.

AAA: No flaws were observed.

AA: A minute flaw was observed on the surface. But no coating crack nor whitening was observed on the surface.

A: A minor flaw was observed on the surface.

F: A significant flaw was observed on the surface.

(3) Scratch Resistance (Method B)

A color fastness rubbing tester available from TESTER SANGYO CO. LTD. was used. The appearance of the test specimen was evaluated after scratched 1,000 times at a load of 500 gf with JIS test fabric-cotton (Canequim #3) as white cotton fabric for rubbing. The criterion is as follows.

AAA: Very few flaws were observed.

AA: A minute flaw was observed on the surface. But no coating crack nor whitening was observed on the surface.

A: A minor flaw was observed on the surface.

F: A significant flaw was generated together with a coating crack or whitening on the entire surface.

(4) Chemical Resistance

Ethanol was added dropwise to the surface protective layer of the decorative sheet obtained in each of the examples and the comparative examples. The dropwisely added part was covered with a watch glass and left at room temperature (25° C.) for 1 hour. The watch glass was removed, and then the appearance was observed and evaluated based on the following criterion.

AA: No significant changes were observed on the coated film.

F: The coated film was swollen or detached.

(5) Weight-Average Molecular Weight and Number-Average Molecular Weight

A high speed GPC available from TOSOH CORPORATION was used. The column used is also available from TOSOH CORPORATION, the brand name of which is "TSKgel aM." As the solvent, N-methyl-2-pyrrolidinone (NMP) was used. The measurement was conducted at a temperature of 40° C. and a flow rate of 0.5 cc/min. The weight-average molecular weight and the number-average molecular weight in the present invention were converted into standard polystyrene equivalents.

(6) Mean Molecular Weight Between Cross-Linking Points

The mean molecular weight between the cross-linking points was calculated by dividing the number-average molecular weight obtained above by the number of functional groups.

(7) Young's Modulus

The tension test in accordance with JIS K 7127 was conducted. Then, the Young's modulus was determined by the following equation based on the tension when a load was applied to the test specimen of the cured coating film of a multi-functional (meth)acrylate.

$$E = (W \times L)/(A \times \Delta t)$$

In the equation, W represents a load (kg), L represents a baseline gauge length (cm), A represents a cross-sectional area of the test specimen, and $\Delta t$ represents a gauge length (cm) at a load W.

The resin composition produced in each of the examples and the comparative examples was applied on a polyethylene terephthalate (hereinafter referred to as "PET") film to which surface treatment was not applied so that the film thickness after the cross-linking and curing is about 15 μm. This uncured resin layer was irradiated with electron beams with an irradiation dose of 50 kGy (5 Mrad) at an accelerating voltage of 165 kV to cure the electron beam curable resin composition. The cured film was peeled off from the PET film, and then a test specimen was cut in a width of 25 mm and a length of 120 mm out of the cured film.

The testing condition included a tension rate of 50 mm/minute, an interchuck distance of 80 mm, and a gauge length of 50 mm.

Examples 1-7 and Comparative Examples 1-4

As the substrate, an ABS resin film (flexural modulus; 2000 MPa, thickness; 400 μm) was used to form a picture layer with a wood grain pattern on the surface of the film by gravure printing using acrylic resin inks. Then, a primer layer consisting of a primer composition containing an acrylic polyol and hexamethylene diisocyanate was coated on the surface of the picture layer by gravure reverse coating. (The hexamethylene diisocyanate was mixed in the same NCO equivalent as the OH equivalent of the acrylic polyol). The thickness of the primer layer was 3 μm.

Then, the electron beam curable resin composition shown in Table 1 was coated on the surface of the primer layer by gravure coating so that the thickness (μm) of the resin composition after curing was as described in Table 1. This uncured resin layer was irradiated with electron beams with an irradiation dose of 50 kGy (5 Mrad) at an accelerating voltage of 165 kV to cure the electron beam curable resin composition. Then, 11 kinds of decorative sheets were obtained.

The decorative sheets were evaluated by the above-mentioned method. The evaluation results are shown in Table 1.

TABLE 1

|  |  | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| Resin composition | Electron beam curable resin A | 94 | 94 | 94 | 90 | 87 | 85 | — | — | — | 50 | 100 |
|  | Electron beam curable resin B | — | — | — | — | — | — | 95 | — | — | — | — |
|  | Electron beam curable resin C | 6 | 6 | — | 10 | 10 | 10 | — | 100 | — | 50 | — |
|  | Electron beam curable resin D | — | — | 6 | — | 3 | 5 | 5 | — | 100 | — | — |

TABLE 1-continued

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| | Thickness of resin composition after curing (μm) | 10 | 20 | 8 | 6 | 8 | 8 | 5 | 8 | 8 | 8 | 8 |
| Examination result | Three-dimensional formability | AAA | AA | AAA | AA | AA | AAA | AA | F | F | F | AA |
| | Scratch resistance (Method A) | AAA | AAA | AA | AAA | AAA | AA | AA | AA | AAA | A | F |
| | Scratch resistance (Method B) | AAA | AAA | AAA | AAA | AAA | AA | AA | AAA | AA | A | F |

Note:
Electron beam curable resin A: polycarbonate acrylate with two functional groups, weight-average molecular weight: 10,000
Electron beam curable resin B: polycarbonate acrylate with six functional groups, weight-average molecular weight: 6,000
Electron beam curable resin C: urethane acrylate oligomer with six functional groups, weight-average molecular weight: 6,000
Electron beam curable resin D: urethane acrylate oligomer with six functional groups, weight-average molecular weight: 10,000

Examples 8-12 and Comparative Examples 5-8

As the substrate, an ABS resin film (flexural modulus; 2000 MPa, thickness; 400 μm) was used to form a picture layer with a wood grain pattern on the surface of the film by gravure printing using acrylic resin inks. Then, a primer layer consisting of a primer composition containing an acrylic polyol and hexamethylene diisocyanate was coated on the surface of the picture layer by gravure reverse coating. (The hexamethylene diisocyanate was mixed in the same NCO equivalent as the OH equivalent of the acrylic polyol). The thickness of the primer layer was 3 μm.

Then, the electron beam curable resin composition shown in Table 2 was coated on the surface of the primer layer by gravure coating so that the thickness (μm) of the resin composition after curing is as described in Table 2. This uncured resin layer was irradiated with electron beams with an irradiation dose of 50 kGy (5 Mrad) at an accelerating voltage of 165 kV to cure the electron beam curable resin composition. Then, 9 kinds of decorative sheets were obtained.

The decorative sheets were evaluated by the above-mentioned method. The evaluation results are shown in Table 2.

TABLE 2

| | | Examples | | | | | Comparative Examples | | | |
|---|---|---|---|---|---|---|---|---|---|---|
| | | 8 | 9 | 10 | 11 | 12 | 5 | 6 | 7 | 8 |
| Resin composition | Electron beam curable resin E | 70 | — | — | — | — | 100 | — | — | — |
| | Electron beam curable resin F | — | 70 | — | — | — | — | — | — | — |
| | Electron beam curable resin G | — | — | 70 | 70 | 50 | — | 100 | — | 30 |
| | Electron beam curable resin H | 30 | 30 | 30 | — | — | — | — | 100 | — |
| | Electron beam curable resin I | — | — | — | 30 | 50 | — | — | — | 70 |
| | Thickness of resin composition after curing (μm) | 7 | 7 | 7 | 10 | 10 | 7 | 7 | 7 | 33 |
| Examination result | Three-dimensional formability | AA | AA | AA | AA | AA | F | F | F | A |
| | Chemical resistance | AA | AA | AA | AA | AA | AA | F | AA | F |
| | Scratch resistance (Method B) | AA | AA | AA | AA | AA | F | F | AA | F |

Electron beam curable resin E: acrylic silicone acrylate, weight-average molecular weight: 20,000, mean molecular weight between cross-linking points: 100
Electron beam curable resin F: acrylic silicone acrylate, weight-average molecular weight: 20,000, mean molecular weight between cross-linking points: 200
Electron beam curable resin G: acrylic silicone acrylate, weight-average molecular weight: 20,000, mean molecular weight between cross-linking points: 400
Electron beam curable resin H: urethane acrylate oligomer with six functional groups, weight-average molecular weight: 5,000, Young's modulus of cured coating film of ionizing radiation curable resin composition: 800 MPa
Electron beam curable resin I: urethane acrylate oligomer with two functional groups, weight-average molecular weight: 15,000, Young's modulus of cured coating film of ionizing radiation curable resin composition: 200 MPa The decorative sheets of Examples 1-12 of the present invention exhibited excellent three-dimensional formability without no cracks being generated in typical insert molding and simultaneously injection-molding and decoration, even under the condition of rapid temperature drop from a heating temperature of about 160° C. to that at the contact with a mold, a rapid extension rate, and a high degree of drawing. It was confirmed that the surfaces of the produced decorative resin-molded articles had high scratch resistance.

Furthermore, it was confirmed that the decorative sheets of Examples 8-12 had high chemical resistance.

INDUSTRIAL APPLICABILITY

The decorative sheet of the present invention is used for various decorative resin-molded articles, suitably for use in, for example, the internal or exterior material of a vehicle such as an automobile; carpentry members such as a base board and a cornice; fittings such as a window and a door frames; internal materials in a building, such as a wall, a floor, and a ceiling; housings for home electric appliances such as a television set and an air conditioner; and a container.

EXPLANATION OF THE CODES

10. Decorative sheet
11. Substrate
12. Picture layer
13. Primer layer
14. Surface protective layer

The invention claimed is:

1. A decorative sheet comprising at least a surface protective layer on a substrate, wherein the surface protective layer includes a cured material of an ionizing radiation curable resin composition at least containing a polycarbonate(meth)acrylate (A) and a multi-functional (meth)acrylate (B) in a mass ratio (A)/(B) of (98/2)-(70/30), and wherein the weight-average molecular weight of the polycarbonate(meth)acrylate (A) is more than 2,000.

2. The decorative sheet according to claim 1, wherein the multi-functional (meth) acrylate monomer (B) has three or more functional groups.

3. A decorative resin-molded article that includes the decorative sheet according to claim 1.

4. A decorative sheet comprising at least a surface protective layer on a substrate, wherein the surface protective layer includes a cured material of an ionizing radiation curable resin composition at least containing an acrylic silicone (meth)acrylate (C) and a multi-functional (meth)acrylate (B) in a mass ratio (C)/(B) of (50/50)-(95/5), and wherein the weight-average molecular weight of the acrylic silicone (meth)acrylate (C) is 2,000 or more.

5. The decorative sheet according to claim 4, wherein the weight-average molecular weight of the acrylic silicone (meth)acrylate (C) is 2,000-100,000.

6. The decorative sheet according to claim 4, wherein the mean molecular weight between the cross-linking points of the acrylic silicone (meth)acrylate (C) is 100-2,500.

7. The decorative sheet according to claim 4, wherein the multi-functional (meth) acrylate monomer (B) has three or more functional groups.

8. A decorative resin-molded article that includes the decorative sheet according to claim 4.

9. The decorative sheet according to claim 4, wherein the acrylic silicone (meth)acrylate (C) has structural units selected from the following formulas (2), (3) and (4):

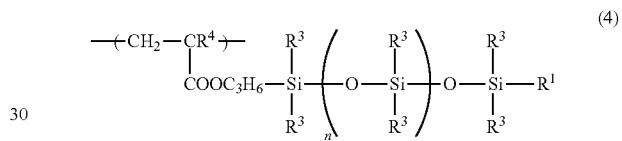

wherein $R^1$ represents an alkyl group with 1-4 carbon atoms, $R^3$s may be the same as or different from each other, and each represents a hydrocarbon group with 1-6 carbon atoms, $R^4$ represents a hydrogen atom or a methyl group, $R^5$ represents an alkyl group or a glycidyl group, $R^6$ represents an organic group with a (meth)acryloyloxy group, and n is an integer.

* * * * *